United States Patent [19]
Kuroda et al.

[11] Patent Number: 5,387,334
[45] Date of Patent: Feb. 7, 1995

[54] APPARATUS FOR REGULATING LIQUID TEMPERATURE

[75] Inventors: Toshiaki Kuroda, Takasagoshi; Hiroyuki Inoue, Kakogawashi, both of Japan

[73] Assignee: Toa Medical Electronics Co., Ltd., Kobe, Japan

[21] Appl. No.: 997,130

[22] Filed: Dec. 28, 1992

Related U.S. Application Data

[63] Continuation of Ser. No. 791,018, Nov. 13, 1991, abandoned.

[30] Foreign Application Priority Data

Feb. 15, 1991 [JP] Japan ............... 3-013186[U]
Apr. 23, 1991 [JP] Japan ............... 3-036978[U]

[51] Int. Cl.⁶ ........................................... B01D 17/12
[52] U.S. Cl. ................... 210/121; 73/863.11; 73/864.91; 165/905; 210/149; 210/179; 422/100; 422/109; 501/88
[58] Field of Search ............... 210/137, 149, 175, 179, 210/184, 121; 417/379; 73/863.11, 863.01, 863.41, 864.91; 501/88; 236/1 R; 422/99, 100, 103, 104, 82.12, 102, 109, 146, 199, 241, 101; 252/70; 165/135, 902, 905

[56] References Cited

U.S. PATENT DOCUMENTS

| 3,460,393 | 8/1969 | Putnam ............... 73/863.11 |
| 3,503,259 | 3/1970 | Carlson et al. ...... 73/863.11 |
| 3,664,178 | 5/1972 | Spergel et al. ...... 73/863.11 |
| 4,073,182 | 2/1978 | Allington ............ 436/174 |
| 4,670,219 | 6/1987 | Nelson et al. ....... 73/863.11 |
| 4,735,259 | 4/1988 | Vincent ............... 165/135 |
| 4,787,986 | 11/1988 | Dietz et al. ........ 210/175 |
| 4,810,394 | 3/1989 | Masuda ............... 436/177 |
| 4,885,263 | 12/1989 | Brockmeyer et al. . 501/88 |
| 5,039,340 | 8/1991 | Hargus et al. ....... 210/510.1 |
| 5,064,542 | 11/1991 | Negersmith et al. .. 436/177 |
| 5,075,160 | 12/1991 | Stinton et al. ...... 210/510.1 |
| 5,135,893 | 8/1992 | Dohi et al. .......... 501/88 |

FOREIGN PATENT DOCUMENTS

| 270130 | 6/1988 | European Pat. Off. ... 417/379 |
| 299903 | 1/1989 | European Pat. Off. ... 252/70 |
| 3516587 | 12/1985 | Germany .............. 501/88 |
| 2043910 | 2/1990 | Japan ................. 210/184 |
| 2043911 | 2/1990 | Japan ................. 210/84 |
| 2043913 | 2/1990 | Japan ................. 210/84 |
| 2043914 | 2/1990 | Japan ................. 210/184 |
| 2043915 | 2/1990 | Japan ................. 210/184 |

Primary Examiner—Joseph W. Drodge
Attorney, Agent, or Firm—Jones, Tullar & Cooper

[57] ABSTRACT

The apparatus for regulating liquid specimen temperature is used to maintain the liquid temperature of a sample constant in order to maintain a specific reaction state of the sample in an apparatus for analyzing samples, such as a blood analyzing apparatus. In this apparatus, a main body is included which is made of ceramics comprised mainly of silicon carbide high in thermal efficiency and excellent in chemical resistance. A liquid inlet is disposed at one end of a passage passing through the main body, which is used for heating. Preferably, the liquid inlet is opened toward the passage inner wall, and a liquid separating member for moving the liquid as it flows into the passage is disposed in the passage. When the liquid separating member is installed in the passage, the incoming liquid, not controlled in temperature, and the liquid leaving the passage already controlled in temperature may be separated, so that liquid control precision may be enhanced.

10 Claims, 8 Drawing Sheets

APPARATUS FOR REGULATING LIQUID TEMPERATURE

This is a continuation of co-pending application Ser. No. 07/791,018 filed on Nov. 13, 1991 and now abandoned.

BACKGROUND OF THE INVENTION

The present invention relates to an apparatus for regulating liquid temperature (liquid thermostatic apparatus) used for keeping constant the reaction state of a sample by keeping constant the liquid temperature of the sample in a sample analyzing apparatus such as a blood analyzing apparatus.

In a sample analyzing apparatus, in order to always keep constant the progressive state of the reaction of the sample, the temperature of the liquid such as a reagent used in the reaction is kept constant by an apparatus for regulating liquid temperature. Such an apparatus for regulating liquid temperature comprises a main body having a space for passing or collecting therein liquid, a heat source such as a heater mounted on the main body, a sensor for detecting the temperature, and a temperature control circuit for operating the heat source as specified so as to keep the temperature of the main body constant according to the signal from the sensor. The reagent liquid contact with the main body inside, and heat is transmitted, so that the temperature may be kept constant.

Required conditions for the main body of such an apparatus for regulating liquid temperature are heat conductivity and chemical resistance. If the heat conductivity is poor, the liquid cannot be heated promptly, besides, the reagent contains acids and other chemicals, and it is important that the main body is not attacked by such reagent or does not degenerate the reagent.

As the materials of the main body, (a) stainless steel and (b) Pesin-coated aluminum have been used, among others.

The stainless steel is excellent in chemical resistance, but is not so good in heat conductivity (about 1/10 that of aluminum).

On the other hand, aluminum has an excellent heat conductivity of 0.56 [cal/cm·sec·°C.] at 20° C., but is poor in chemical resistance, and it must be used by coating it with fluoroplastics or other resins excellent in chemical resistance in the area contacting with liquid. To prevent pinholes, however, the thickness of the coating must be increased. The resin is POOP in thermal conductivity, and when the coating becomes thick, an adiabatic effect is caused in the area, and the thermal conductivity becomes inferior between the main body and the liquid.

OBJECTS AND SUMMARY OF THE INVENTION

It is, therefore, a primary object of the invention to provide an apparatus for regulating liquid temperature which is excellent in both thermal efficiency and chemical resistance.

It is another object of the invention to provide an apparatus for regulating liquid temperature which is capable of improving the liquid control precision.

As a result of searching for materials suited for the apparatus for regulating liquid temperature in order to solve the above problems, it has been found that silicon carbide satisfies the conditions.

To achieve the above objects, in the apparatus for regulating liquid temperature, the material for transmitting heat to the liquid is made of ceramics mainly composed of silicon carbide.

That is, the invention presents an apparatus for regulating liquid temperature for keeping the liquid at a constant temperature by passing the liquid inside the apparatus main body controlled in temperature, wherein the apparatus main body is made of ceramics mainly composed of silicon carbide.

Inside the main body made of ceramics, a passage for collecting or passing liquid is disposed. To communicate with the passage, a liquid inlet and outlet are provided. Outside the main body are installed a heat source for supplying heat to the main body or absorbing it therefrom, and temperature detecting means for sensing the main body temperature. The heat source and temperature detecting means are connected to a temperature control circuit.

The invention presents another apparatus for regulating liquid temperature made of ceramics mainly composed of silicon carbide, wherein the liquid inlet installed at one end of the passage for heating in the apparatus main body is shaped to open toward the passage inner wall.

The invention also presents another apparatus for regulating liquid temperature, wherein the liquid outlet disposed at the other end of the passage for heating is shaped to open widely at the front end of the upstream side.

According to the signal from the temperature detecting means, the temperature control circuit controls the heat generation output of the heat source to keep the main body at a specific temperature.

The heat from the heat source is promptly transmitted to the liquid in the passage from the passage inner wall at the contacting area with the liquid, through the main body excellent in heat conductivity, thereby keeping the liquid temperature at a specific temperature. The liquid entering from the inlet is controlled to a specific temperature, and leaves from the outlet.

The invention presents a different apparatus for regulating liquid temperature to keep the liquid at a constant temperature by passing the liquid into the inside of the apparatus main body controlled in temperature, wherein the apparatus main body is made of ceramics mainly composed of silicon carbide, a liquid passing passage passes through the apparatus main body, a liquid inlet is disposed at one end of this passage, and a liquid outlet at the other end, and a liquid separating member moving in the passage along with the flow of the liquid is disposed in the passage.

In another apparatus for regulating liquid temperature, the liquid inlet is disposed downward and the liquid outlet upward, and the specific gravity of the liquid separating member is greater than that of the liquid.

Furthermore, the liquid inlet is disposed upward and a liquid outlet downward, and the specific gravity of the liquid separating member is smaller to that of the liquid.

The liquid separating member may be, meanwhile, spherical, disk-shaped, disk-shaped with a concave part in the bottom or the top, composed of plural disks and a coupling member for connecting them, or disk-shaped with blades.

The liquid separating member isolates the newly entering liquid in the passage (temperature uncontrolled) and the stagnant liquid in the passage (temperature controlled). That is, when the liquid enters from the inlet, the influent liquid pushes forward the liquid separating member. The liquid separating member further pushes the liquid in the passage to discharge from the outlet. By the presence of the liquid separating member, only the temperature-controlled liquid is forced out. In other words, the fresh liquid not controlled in temperature is not directly discharged, even partly, from the outlet.

When the liquid flowing in and flowing out is stopped, the liquid separating member returns to the initial position. At this time, the newly entering liquid is impeded by the liquid separating member, and flows near the passage inner wall, thereby causing a turbulence in the passage.

DETAILED DESCRIPTION OF THE PREFERRED EMBODIMENTS

Figure 1:
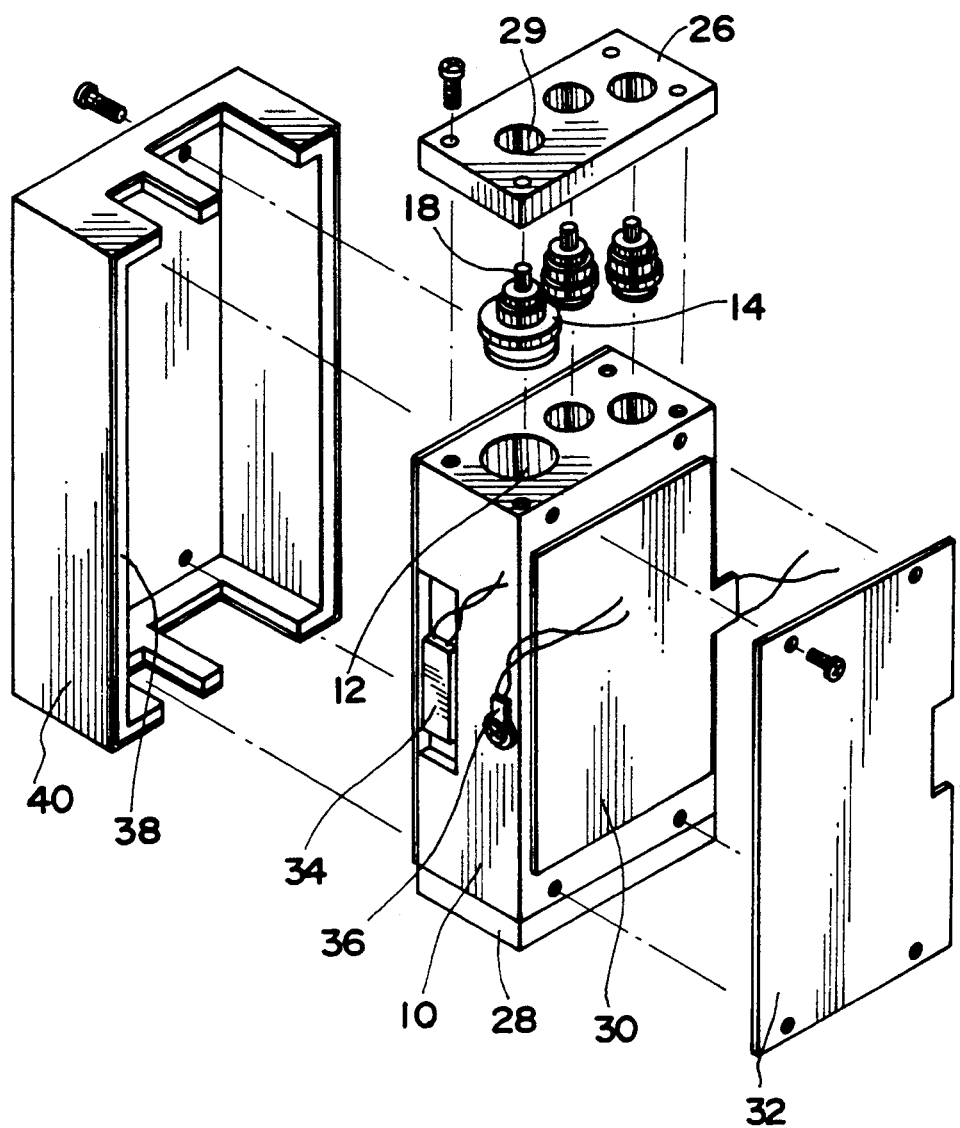
FIG. 1 is a perspective view showing an embodiment of an apparatus for regulating liquid temperature of the invention.

Referring now to the drawings, some of the preferred embodiments of the invention are described in detail below.

Figure 2:
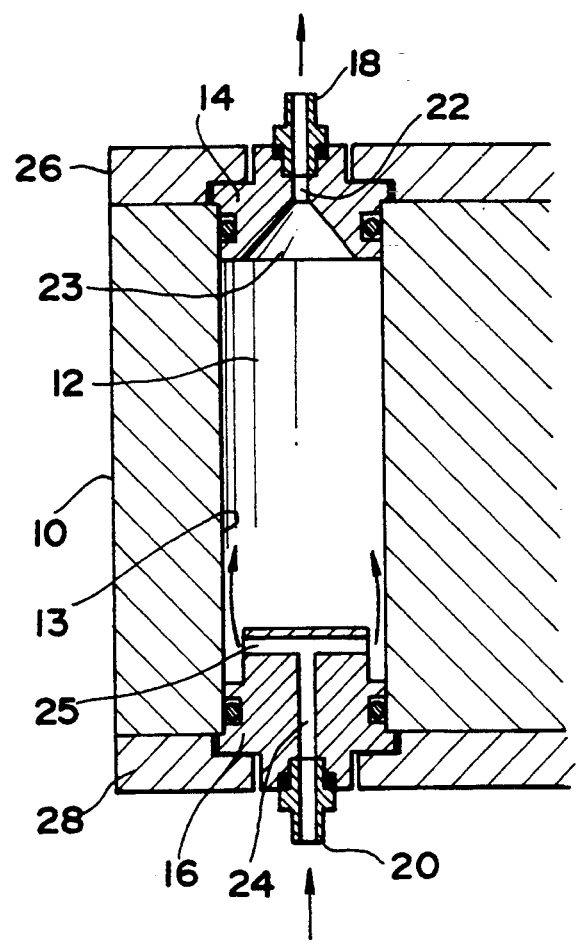
FIG. 2 is a magnified sectional view of a liquid inlet and outlet in FIG. 1.

FIG. 1 is an exploded perspective view showing an embodiment of the invention in the form of an apparatus for regulating liquid temperature of a liquid specimen and FIG. 2 is a magnified sectional view of a liquid inlet and outlet of the apparatus of FIG. 1. The liquid specimen is controlled at, for example, 40±2° C.

Numeral 10 is a main body of an apparatus for regulating liquid temperature, which is composed of ceramics obtained by forming and sintering silicon carbide powder. The thermal conductivity is ½ to ⅓ that of aluminum. The main body 10 has a penetrating passage 12. Numerals 14, 16 refer to plugs fitted at both openings of the passage 12. The plugs 14, 16 are provided with nipples 18, 20, respectively. Holes 22, 24 of the plugs 14, 16 communicate with the nipples 18, 20, respectively.

The nipple 20 serves as a liquid inlet, and the nipple 18 serves as a liquid outlet. Numerals 26, 28 refer to holders for fixing the plugs 14, 16 at the openings of the main body passage 12. The plugs 14, 16 are held between the holders 26, 28 and the main body 10. These holders 26, 28 are fitted to the main body 10 with screws. The nipple part of the plug 14 projects outside of the holder 26 through a hole 29 in the holder 26.

Numeral 30 refers to a heat source for supplying heat, or absorbing heat to or from the main body 10 (finally to and from the liquid in the passage), and in this embodiment, for example, a plate heater is used. The heater only supplies heat, but as required, instead of the heater, an element possessing the functions of both supplying and absorbing heat (for example, a Peltier element) may be used. The heater or other heat source 30 is glued to both sides of the main body 10 by coating the surface with a silicone compound or the like in order to enhance heat conduction. The heater or other heat source 30 is installed in contact with the main body 10 as a holder 32 is fastened to the main body 10 with screws.

Numeral 34 refers to a thermistor, which is a temperature detecting means attached in contact with the main body 10. Numeral 36 refers to a thermostat, which is a protective means for disconnecting the power supply line of the heater or other heat source 30 in case the main body temperature exceeds the allowable range. The main body 10 and the parts mounted on the main body are covered with an insulator 38 so as not to be affected by the ambient temperature. The insulator 38 is glued to the inside of a cover 40, and the cover 40 is designed to wrap over the main body.

Figure 3:
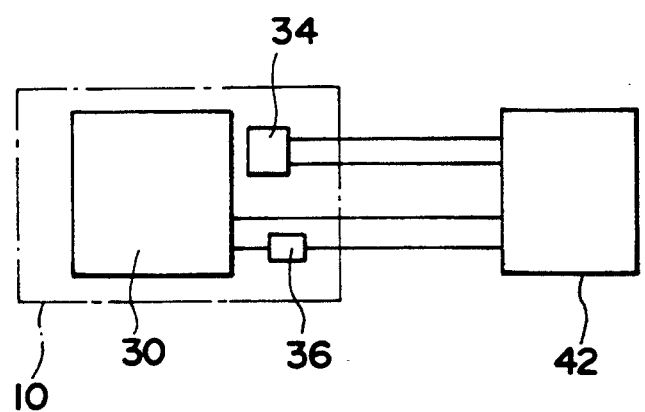
FIG. 3 is an electric wiring diagram in the apparatus for regulating liquid temperature of the invention.

FIG. 3 is an electric wiring diagram for the apparatus for regulating liquid temperature of the invention. The heater or other heat source 30 and the thermistor 34 are connected to a temperature control circuit 42. In the temperature control circuit 42, on the basis of the temperature information obtained from the thermistor 34, the operating state of the heater or other heat source 30 is controlled so that the temperature of the liquid leaving the apparatus fop regulating liquid temperature may be a desired temperature. In this embodiment, for example, the liquid temperature is controlled at 40±2° C. A practical method of temperature control may be realized by utilizing the known art.

The incoming liquid is held in the passage 12 for a specific time, and is discharged after reaching the desired temperature. The liquid subjected to temperature control is, for example, the diluant for diluting a blood sample, or the hemolyzer for hemolyzing erythrocytes.

Meanwhile, the liquid in the passage 12 which is nearer to the wall 13 of the passage 12 reaches the desired temperature more quickly. Accordingly, in order to raise thermal efficiency, inside the main body, it is desired to increase the contact between the main body and the liquid. For example, the passage may be provided with undulations, studs, fins or the like, and the incoming liquid may be passed and led to the vicinity of the passage wall by priority, or the passage may be charged with fillings.

It is also important to prevent the liquid entering the passage 12 from leaving before reaching the desired temperature. That is, the fresh liquid should push out the liquid reaching the intended temperature. It may be realized easily by arranging the liquid feeding method properly. This method is described below.

FIG. 2 is a magnified sectional view of the liquid inlet and outlet parts. A hole 24 of the plug 16 is not a simple penetrating hole, but is formed approximately as a T-hole 25, opening to the side of the main body passage wall 13. A hole 22 of the outlet side plug 14 is approximately a conical hole 23 wider at the front end.

The liquid flowing in from the nipple 20 flows in the direction of the arrow. Thus, when entering the passage 12, the liquid is directed by the T-hole 25 to the passage side wall 13, the liquid having a temperature difference may be promptly regulated to a target temperature, while the liquid which has already reached the target temperature is forced out by the incoming liquid. If the hole 24 of the plug 16 at the inlet side is a mere penetrating hole, the incoming liquid will flow in the middle of the passage 12, and partly run out of the passage without being controlled in temperature.

Figure 4:
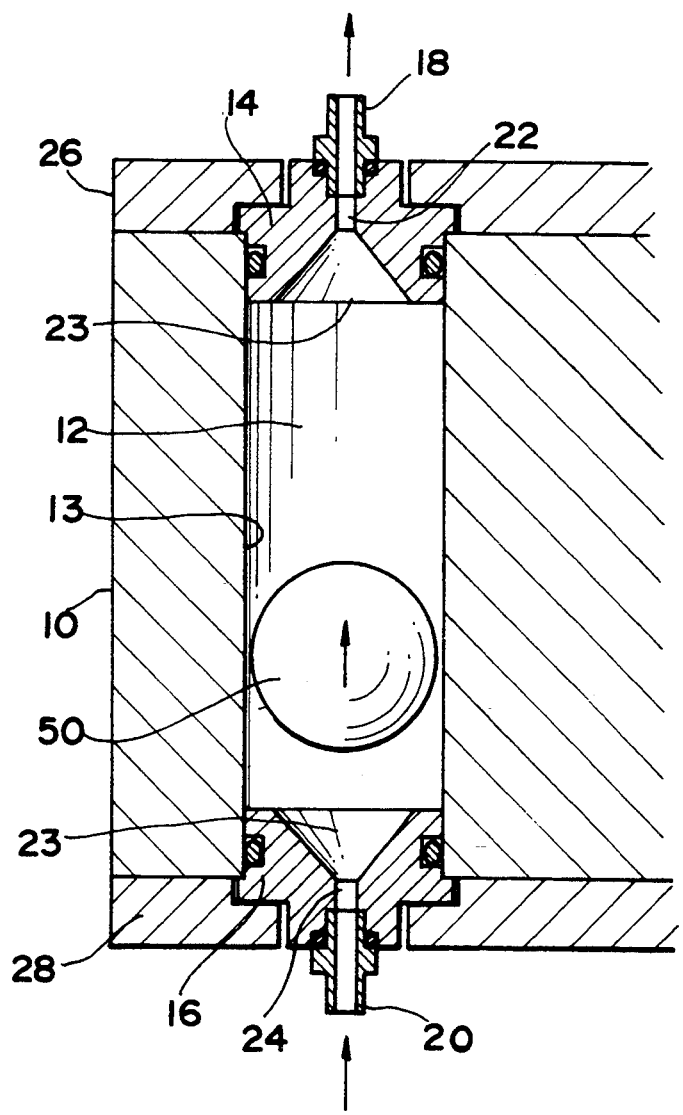
FIG. 4 is a magnified sectional view showing an example of a liquid inlet and outlet part in FIG. 1, relating to a different embodiment of essential parts of an apparatus for regulating liquid temperature of the invention.

Referring now to FIG. 4, another embodiment of the invention is described below. FIG. 4 is a sectional view of a liquid passing passage 12. The passage 12 penetrates through the apparatus main body 10. The liquid inlet is disposed at one end of the penetrating passage 12, and the outlet at the other end. The liquid flows from bottom to top in FIG. 4. Both the hole 24 of the plug 16 at the inlet side and the hole 22 of the plug 14 at the outlet side are approximately conical holes 23 wider at the front end toward the passage 12.

Numeral 50 refers to a spherical liquid separating member. Its outside diameter is slightly smaller than the inside diameter of the passage 12, and its specific gravity is slightly greater than that of the liquid to be controlled in temperature (the liquid passing through the passage 12). Accordingly, the liquid separating member 50 initially contacts the plug 16 by its own gravity, and when a force is applied, it moves upward in the passage 12.

The gap between the liquid separating member 50 and the inner wall 13 of the passage 12 is slight. Suppose liquid flows in from the nipple 20, then the incoming liquid directly pushes up the liquid separating member 50. The liquid in the passage 12 is pushed up by the liquid separating member 50, and flows out of the upper nipple 18 by the same amount as the incoming liquid. That is, if the liquid different from the target temperature flows in, the liquid separating member 50 separates the liquid, and only the liquid reaching the target temperature in the passage 12 is forced out, so that the obtained liquid is the liquid of the target temperature.

Figure 6:
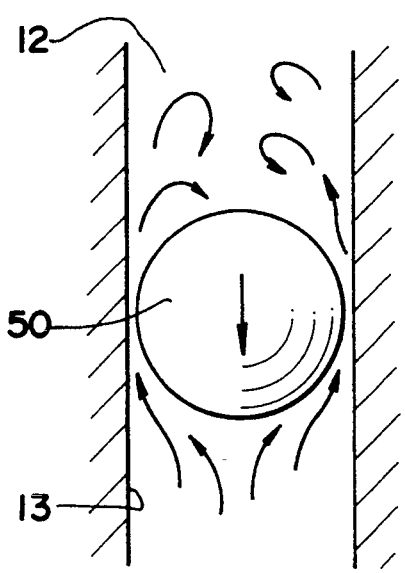
FIG. 6 is an explanatory diagram showing a liquid flow state around a liquid separating member in the invention.

When the inflow of the liquid stops, the liquid separating member 50 slowly descends by gravity, and returns to the initial position. FIG. 6 shows this mode. Along with descending of the liquid separating member 50, the liquid entering just before, staying at the lower side of the liquid separating member 50, gradually moves to the upper side of the liquid separating member 50. At this time, the liquid is impeded by the liquid separating member 50, and runs through the gap between the liquid separating member 50 and the inner wall 13, so that heat is transmitted efficiently from the inner wall 13. The liquid running through the gap becomes a turbulent flow in the upper part inside the passage 12, and is mixed and stirred, so that the heat is transmitted more efficiently from the inner wall 13.

The specific gravity of the liquid separating member 50 should be preferably closer to the specific gravity of the liquid to be used. If the difference in the specific gravity is too great, movement in the passage when the liquid enters is disturbed, and the liquid separation effect and liquid mixing and stirring effect are sacrificed. As the spherical member 50 presented in this embodiment, a hollow sphere is preferable. Besides, it must be excellent in chemical resistance. For example, a manufacturing method for hollow sphere of silicon carbide is disclosed in Japanese Patent Publication Sho. 56-21749. A resin resistant to chemicals may be also used.

Figure 5:
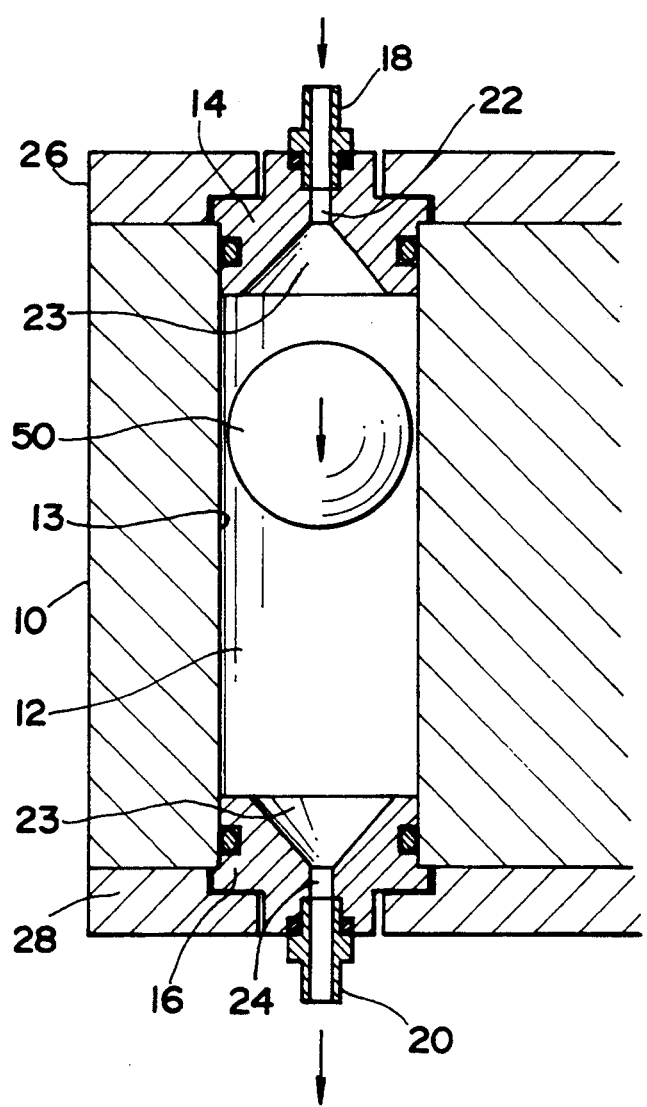
FIG. 5 is a magnified sectional view showing another example of a liquid inlet and outlet part in FIG. 1, relating to a further different embodiment of essential parts of an apparatus for regulating liquid temperature of the invention.

In the example of FIG. 4, the liquid inlet is downward, and the outlet is upward. As shown in FIG. 5, however, it may be considered the same if the inlet is upward and the outlet is downward. In such a case, the specific gravity of the liquid separating member 50 is set slightly smaller than that of the liquid. In FIG. 5, meanwhile, the upper nipple 18 is the liquid inlet, and the lower nipple 20 is the liquid outlet.

Figure 7:
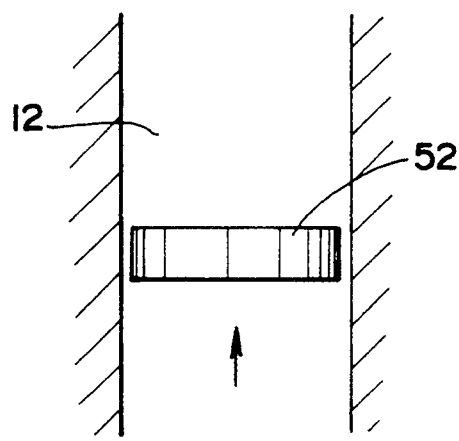
FIG. 7 is an explanatory diagram showing an example of a liquid separating member of the invention.

Various modifications may be also considered for the shape of the liquid separating member. FIG. 7 shows a disk-shaped liquid separating member 52 with a large thickness. If the thickness is too small, the disk-shaped member 52 rotates when the liquid flows in, and it cannot play the role of liquid separation.

Figure 8:
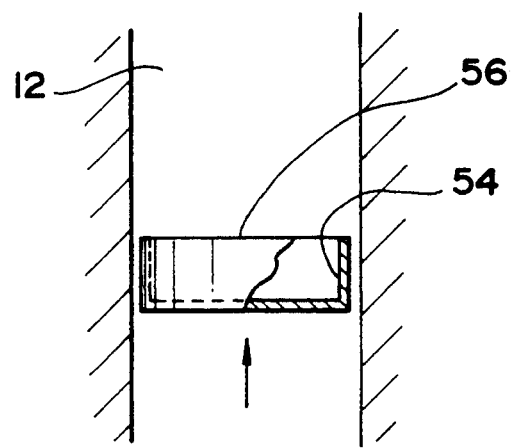
FIG. 8 is an explanatory diagram showing another example of a liquid separating member of the invention.

FIG. 8 shows a disk-shaped liquid separating member 56 having a concave part 54 on one side. The reason for forming the concave part 54 is to reduce the entire weight of the member 56 in spite of the large specific gravity of the material, thereby making it easier to move in the passage 12. In FIG. 8, the concave part 54 is disposed in the top surface, but it may be also formed in the bottom surface.

Figure 9:
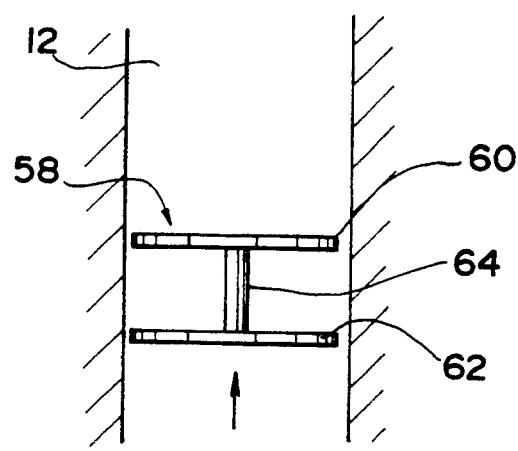
FIG. 9 is an explanatory diagram showing another example of a liquid separating member of the invention.

FIG. 9 shows a liquid separating member 58 composed of plural thin disks 60, 62, and a slender columnar coupling member 64 for coupling these disks. The liquid passes through the lower first disk 62, and then the upper second disk 60, that is, it is mixed and stirred twice, and the heat conduction effect is superior. In FIG. 9, two disks are used, but three or more disks may be also used.

Figure 10:
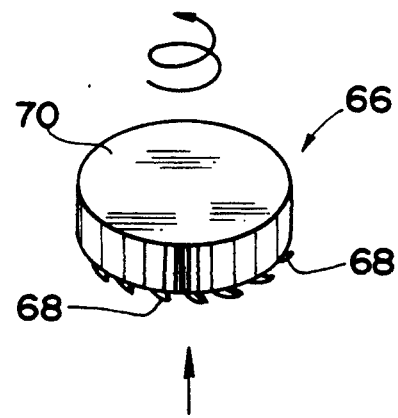
FIG. 10 is a perspective view showing a further different example of a liquid separating member of the invention.

FIG. 10 shows a disk-shaped liquid separating member 66 having plural blades 68 disposed on the plane at the liquid inflow side of the disk. When the liquid flows in from below, the liquid separating member 66 goes up while rotating as indicated by the arrow by means of the blades 68. It similarly rotates when descending. When the liquid passes through the gap between the passage and the disk-shaped member 66, it receives a torque, and the top surface 70 of the member 66 also rotates, and therefore the liquid continues to receive a torque after passing through, and is further mixed and stirred, so that the heat conduction effect is better.

Being thus composed, the apparatus for regulating liquid temperature of the invention brings about the following effects.

(1) Since the main body is made of ceramics mainly composed of silicon carbide, the apparatus for regulating liquid temperature is superior in thermal efficiency and excellent in chemical resistance. Besides, because of the ceramic structure, the processing precision and surface finishing precision may be improved.

(2) When the liquid inlet is shaped to open toward the passage inner wall, the liquid flowing into the passage for heating may be directed toward the passage wall side, and therefore the liquid having a temperature difference may be quickly regulated to a desired temperature, while the liquid that has already reached the desired temperature may be pushed out by the incoming liquid.

(3) When the liquid separating member is installed in the passage, the incoming liquid not controlled in temperature and the existing liquid in the passage already controlled in temperature may be separated, and only the liquid already controlled in temperature is discharged, so that liquid control precision is enhanced. Afterwards, as the liquid separating member returns to the initial position, the liquid is forced to be passed to the vicinity of the inner wall of the passage, while producing a turbulence in the passage to mix and stir the liquid, so that the heat conduction efficiency is improved and the liquid is promptly regulated to the desired temperature within the passage.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for regulating the, temperature of a liquid specimen, and for maintaining the liquid specimen at a constant temperature, comprising:
    a ceramic body, comprised mainly of silicon carbide, said body including an inner wall defining a passage which penetrates said body, an inlet at one end of said passage through which the liquid specimen flows into said passage from outside the body, and an outlet at the other end of said passage through which the liquid specimen flows out of said passage;
    a heat source operable for supplying heat or absorbing heat to or from said body;
    temperature detecting means for detecting the temperature of said body;
    temperature control means operatively associated with said heat source and said temperature detecting means for controlling the operation of said heat source, as a function of the temperature reading obtained from said temperature detecting means, such that the temperature of the liquid specimen flowing out of said passage through said outlet is at a desired temperature; and
    a liquid separating member disposed to form a gap with the inner wall of said passage and to move in said passage along with the flow of liquid specimen in said passage so as to separate liquid specimen flowing into said passage from liquid specimen flowing out of said passage.

2. The apparatus for regulating the temperature of a liquid specimen as defined in claim 1, wherein the inlet is disposed downward and the outlet upward, and the specific gravity of the liquid separating member is greater than that of the liquid.

3. The apparatus for regulating the temperature of a liquid specimen as defined in claim 1, wherein the inlet is disposed upward and the outlet downward, and the specific gravity of the liquid separating member is smaller than that of the liquid.

4. The apparatus for regulating the temperature of a liquid specimen as defined in claim 1, wherein the liquid separating member is spherical.

5. The apparatus for regulating the temperature of a liquid specimen as defined in claim 1, wherein the liquid separating member is disk-shaped.

6. The apparatus for regulating the temperature of a liquid specimen as defined in claim 1, wherein the liquid separating member is disk-shaped having top and bottom surfaces and a concave part in one of the bottom and top surfaces.

7. The apparatus for regulating the temperature of a liquid specimen as defined in claim 1, wherein the liquid separating member comprises a plurality of disks and a coupling member for coupling said disks.

8. The apparatus for regulating the temperature of a liquid specimen as defined in claim 1, wherein the liquid separating member is disk-shaped and including a plurality of blades.

9. An apparatus for regulating the temperature of a liquid specimen, and for maintaining the liquid specimen at a constant temperature, comprising:
    a ceramic body, composed mainly of silicon carbide, said body including an inner wall defining a passage and an inlet at one end of said passage through which the liquid specimen enters into said passage from outside the body and an outlet at the other end of said passage through which the liquid specimen flows out of said passage, said inlet being adapted to direct the liquid specimen entering said passage toward the inner wall by causing the entering liquid specimen to have a plurality of liquid flow direction components;
    means operatively associated with said ceramic body for controlling the temperature of said body to said constant temperature;
    a heat source for supplying heat or absorbing heat to or from said body; and
    temperature detecting means for detecting the temperature of said body; wherein:
    said means for controlling the temperature of said body is operatively associated with said heat source and said temperature detecting means for controlling the operating state of said heat source, as a function of the temperature reading obtained from said temperature detecting means, such that the temperature of the liquid specimen leaving said passage through said outlet is at a desired temperature.

10. The apparatus for regulating the temperature of a liquid specimen as defined in claim 9, wherein said outlet has a front end defining an upstream side, said front end being shaped conically to open widely at its upstream side.

* * * * *